(12) United States Patent
Sasaoka et al.

(10) Patent No.: US 8,417,077 B2
(45) Date of Patent: Apr. 9, 2013

(54) OPTICAL BRANCHING DEVICE AND OPTICAL COMMUNICATION SYSTEM INCLUDING THE SAME

(75) Inventors: Eisuke Sasaoka, Yokohama (JP); Osamu Shimakawa, Yokohama (JP); Takuji Nagashima, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 183 days.

(21) Appl. No.: 13/083,757

(22) Filed: Apr. 11, 2011

(65) Prior Publication Data

US 2011/0249940 A1    Oct. 13, 2011

(30) Foreign Application Priority Data

Apr. 13, 2010   (JP) ................................ P2010-092525

(51) Int. Cl.
   *G02B 6/26*   (2006.01)
(52) U.S. Cl. ............ 385/39; 385/43; 385/114; 385/115; 385/44
(58) Field of Classification Search ............ 385/31, 385/39, 15, 44, 45, 126, 127, 128, 115, 43, 385/114
See application file for complete search history.

(56) References Cited

U.S. PATENT DOCUMENTS

| | | | |
|---|---|---|---|
| 4,989,945 A * | 2/1991 | Ohkura | ........................... 385/39 |
| 6,160,943 A | 12/2000 | Davis et al. | |
| 7,139,456 B2 * | 11/2006 | Sasaki et al. | ................... 385/114 |
| 7,509,009 B2 * | 3/2009 | Suzuki et al. | ................... 385/114 |
| 2007/0081774 A1* | 4/2007 | Suzuki et al. | ................... 385/109 |
| 2011/0109898 A1* | 5/2011 | Froggatt et al. | ............... 356/73.1 |
| 2011/0249940 A1* | 10/2011 | Sasaoka et al. | ................. 385/39 |
| 2011/0310378 A1* | 12/2011 | Froggatt et al. | ............... 356/35.5 |
| 2012/0224808 A1* | 9/2012 | Hayashi et al. | .................. 385/31 |
| 2012/0250008 A1* | 10/2012 | Hayashi | ....................... 356/73.1 |

FOREIGN PATENT DOCUMENTS

| | | |
|---|---|---|
| FR | 2822313 | 9/2002 |
| JP | S56-151905 | 11/1981 |
| JP | 5-341147 | 12/1993 |
| JP | 10-104443 | 4/1998 |

* cited by examiner

Primary Examiner — Brian Healy
(74) Attorney, Agent, or Firm — Drinker Biddle & Reath LLP (57) ABSTRACT

The present invention provides an optical branching device and an optical communication system which are easy to connect with optical fibers. In the optical branching device, when light emitted from an optical fiber in a front stage is incident on an entrance port of a multicore optical fiber, the light propagates through a first core and then is distributed from the first core to four second cores by core-to-core crosstalk between the first and second cores. The light beams distributed to the four second cores propagate through the respective cores and are emitted to four optical waveguides optically coupled core-to-core thereto within a fan-out part at exit ports.

8 Claims, 11 Drawing Sheets

OPTICAL BRANCHING DEVICE AND OPTICAL COMMUNICATION SYSTEM INCLUDING THE SAME

BACKGROUND OF THE INVENTION

1. Field of the Invention

The present invention relates to an optical branching device and an optical communication system including the same.

2. Related Background Art

Figure 1:
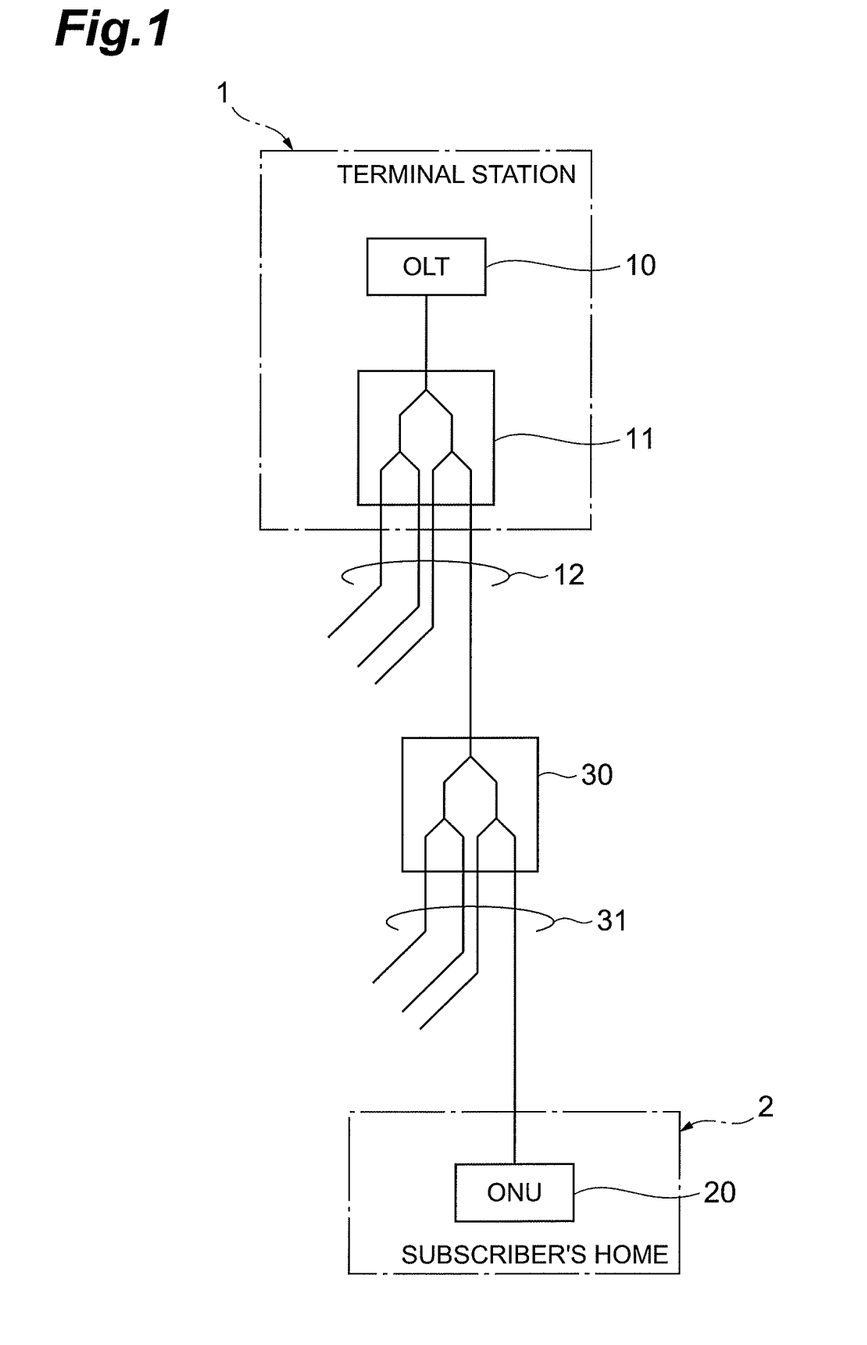
FIG. 1 is a diagram showing the structure of an optical communication system (PON system)

For providing an FTTH (Fiber To The Home) service which enables optical communications between one transmitter station and a plurality of subscribers, an optical communication system known as a so-called PON (Passive Optical Network) system in which the subscribers share a single optical fiber through a multistage of optical splitters as shown in FIG. 1, for example, has conventionally been brought into reality.

That is, the PON system shown in FIG. 1 comprises a terminal station 1 (transmitter station) which is the last relay station of an existing communication system such as the Internet and an optical fiber network laid between the terminal station 1 and subscribers' homes 2 (subscribers). The optical fiber network is constituted by closures (each including an optical branching device 30) provided as branching points, optical communication lines 12 from the terminal station 1 to the closures, and optical communication lines 31 from the closures to the individual subscribers' homes 2.

The terminal station 1 comprises a station-side terminating unit 10 (OLT: Optical Line Terminal) and an optical branching device 11 for branching a multiplexed signal from the OLT 10. On the other hand, each subscriber's home 2 is provided with a subscriber-side terminating unit 20 (ONU: Optical Network Unit). In the closure serving as a branching point of the optical fiber network laid between the terminal station 1 and subscriber's home 2, at least the optical branching device 30 for further branching the multiplexed signal having arrived there and a wavelength selective filter for restricting service contents are arranged.

Since the optical branching devices 11, 30 are disposed within the terminal station 1 and the closure arranged on the optical fiber network, respectively, one station-side terminating unit 10 can provide a plurality of subscribers with FTTH services in the PON system shown in FIG. 1. For branching the multiplexed signal into a number of subscribers' homes 2, a number of optical branching devices are used in this PON system. Therefore, optical branching devices which can be mass-produced inexpensively and installed easily are desired.

SUMMARY OF THE INVENTION

The inventors studied conventional optical communication systems and, as a result, have found the following problem. As an optical branching device which is connected to a rear stage of one optical fiber and supplies light entering from the optical fiber to a plurality of optical fibers, an optical waveguide chip formed with optical waveguides corresponding to the numbers of optical fibers in front and rear thereof is used in general. When this optical waveguide chip is used as the optical branching device, however, for connecting the optical waveguide chip to the optical fibers disposed in front and rear thereof, they must be joined and secured after being aligned with each other. Such an operation is carried out on the site of installation, which makes it harder to attach the optical branching device accurately to a plurality of optical fibers.

For solving the problem mentioned above, it is an object of the present invention to provide an optical branching device which is easy to connect with optical fibers and an optical communication system equipped with the optical branching device.

For solving the above-mentioned problem, the optical branching device according to the present invention comprises a multicore optical fiber and a fan-out part. The multicore optical fiber comprises a first core extending along a predetermined axis and a cladding surrounding one or more second cores. The multicore optical fiber has a first end face, a second end face opposing the first end face, an entrance port A positioned on the first end face, and a plurality of exit ports B positioned on the second end face. The entrance port A positioned on the first end face guides light from the outside to the first core. The plurality of exit ports B positioned on the second end face take out the light propagated through the first and second cores. The fan-out part has a third end face opposing the second end face of the multicore optical fiber, a fourth end face opposing the third end face, a plurality of entrance ports C positioned on the third end face, and a plurality of exit ports D positioned on the fourth end face. The plurality of entrance ports C positioned on the third end face are arranged such as to optically couple with the plurality of exit ports B. The plurality of exit ports D positioned on the fourth end face are arranged such as to correspond to the plurality of entrance ports C, respectively, while having a center-to-center distance longer than that of the plurality of entrance ports C on the third end face. Known structural examples of the multicore optical fiber include those disclosed in Japanese Patent Application Laid-Open Nos. 05-341147 and 10-104443.

In particular, in the optical branching device according to the present invention, the number of the exit ports B is greater than the number of the entrance ports A but equal to or less than the total number of the first and second cores. At least a part of the light incident on the first core through the entrance port A is branched to the second core by core-to-core crosstalk. Here, one end face of the first core (coinciding with the first end face of the multicore optical fiber) is provided with the entrance port A, while one end face of the second core (coinciding with the first end face of the multicore optical fiber) is provided with no port. However, the other end face of the first core (coinciding with the second end face of the multicore optical fiber) may be provided with any of the exit ports B.

In the optical branching device having the structure mentioned above, the light having entered the first core from the entrance port A positioned on the first end face of the multicore optical fiber is distributed from the first core to the second core (the core excluding the first core and having no light entering from the outside) by core-to-core crosstalk of the multicore optical fiber. The light propagating through the second core and the light keeping on propagating through the first core are emitted from the exit ports B on the second end face of the multicore optical fiber. The light beams emitted from the exit ports B travel through the entrance ports C optically coupled to their corresponding exit ports B, so as to enter the fan-out part having an end face provided with the entrance ports C. The light beams propagated through the fan-out part are individually emitted through the respective exit ports D corresponding to the entrance ports C. Since it is thus easier for optical fibers in the front stage to be optically coupled to the multicore optical fiber, the optical branching device according to the present invention is easier to connect with optical fibers as compared with the conventional optical branching devices using optical waveguide chips.

In the optical branching device according to the present invention, the fan-out part may have a structure including a plurality of exit optical fibers each having one end face coinciding with one of the plurality of entrance ports C and the other end face coinciding with one of the plurality of exit ports D corresponding thereto.

The optical branching device according to the present invention may further comprise an entrance optical fiber disposed in front of the multicore optical fiber. In this case, the entrance optical fiber guides light from the outside to the first core through the entrance port A on the first end face in the multicore optical fiber.

The first core where the light enters from the outside is not required to be arranged such that its optical axis coincides with the center axis of the multicore optical fiber (the cross-sectional center of the multicore optical fiber orthogonal to the predetermined axis). That is, as an embodiment of the present invention, the first and second cores may be arranged such as to keep clear of the cross-sectional center of the multicore optical fiber in a cross section of the multicore optical fiber which is orthogonal to the predetermined axis.

In the structure in which the first core is arranged such that its optical axis coincides with the cross-sectional center of the multicore optical fiber in the cross section of the multicore optical fiber orthogonal to the predetermined axis, on the other hand, it will be preferred if the second cores disposed about the first core are arranged at equally spaced intervals on a circle centered at the first core. In the structure in which the first core is arranged such that its optical axis coincides with the cross-sectional center of the multicore optical fiber, it will be preferred if the second cores disposed about the first core are equally distanced from the first core. This is because fluctuations in power of light beams propagating through the respective second cores can be lowered thereby.

In the optical branching device according to the present invention, the multicore optical fiber may be installed in a predetermined space while being bent so as to adjust a branching ratio between output light from the first core and second cores.

Preferably, as a structure for improving the coupling efficiency between the multicore optical fiber and entrance optical fiber in the optical branching device according to the present invention, the multicore optical fiber and entrance optical fiber have substantially the same cladding diameter, while cores thereof optically coupled to each other through the entrance port A have substantially the same diameter.

The optical communication system according to the present invention comprises thus constructed optical branching device (the optical branching device according to the present invention). In this case, optical communication lines different from each other are individually optically coupled to the entrance port A and a plurality of exit ports D.

BRIEF DESCRIPTION OF THE DRAWINGS

FIG. 3A is a view showing a schematic structure of a multicore optical fiber constituting a part of the optical branching device according to the first embodiment, while

DESCRIPTION OF THE PREFERRED EMBODIMENTS

In the following, embodiments of the optical branching device according to the present invention will be explained in detail with reference to FIGS. 2A to 3B, 4 to 10, and 11A and 11B. In the explanation of the drawings, the same constituents will be referred to with the same signs while omitting their overlapping descriptions. The optical branching devices in according to the embodiments shown in FIGS. 2A to 3B, 4 to 10, and 11A and 11B are employable in the optical branching devices 11, 30 shown in FIG. 1 as a matter of course.

First Embodiment

Figure 2A:
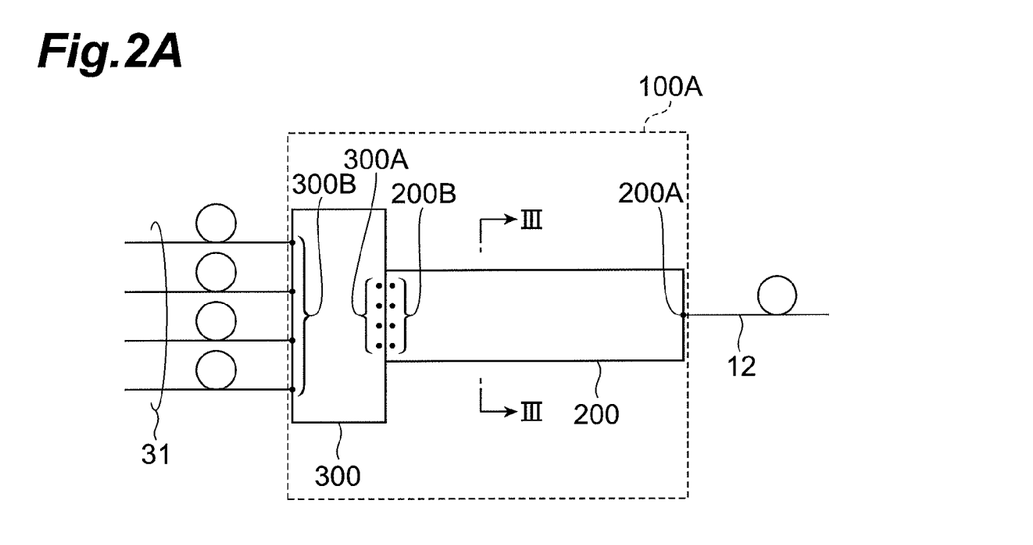
FIGS. 2A and 2B are diagrams showing schematic structures of a first embodiment of the optical branching device according to the present invention.
Figure 2B:
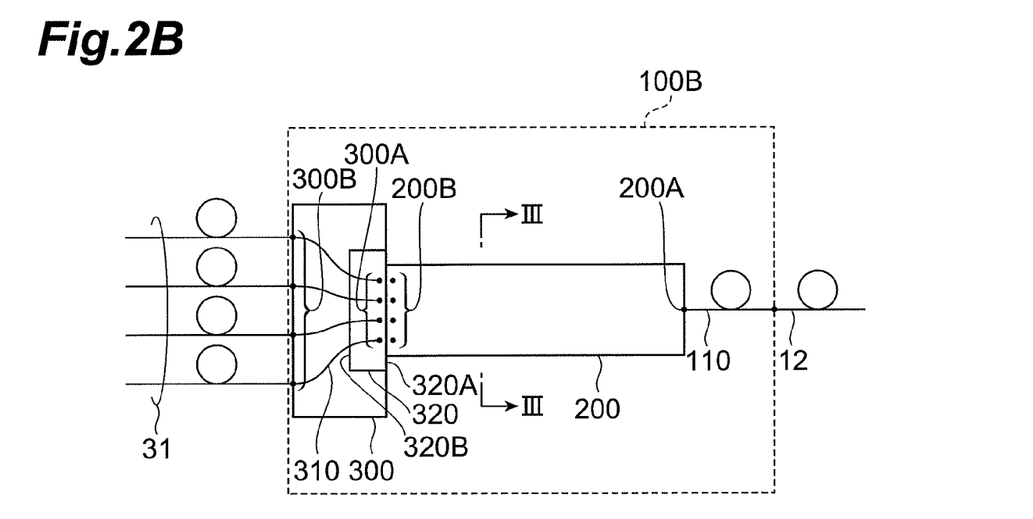
Figure 3A:
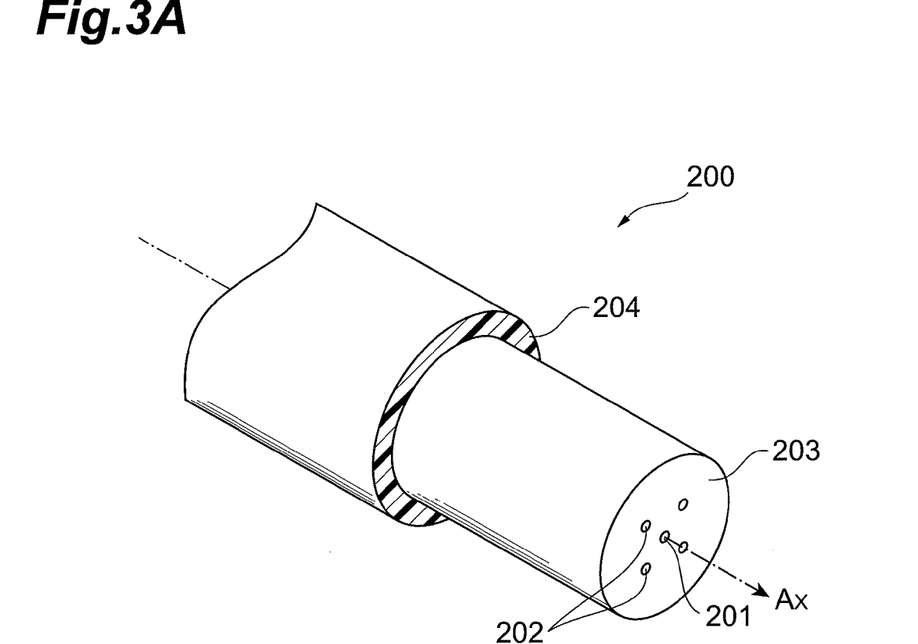
Figure 3B:
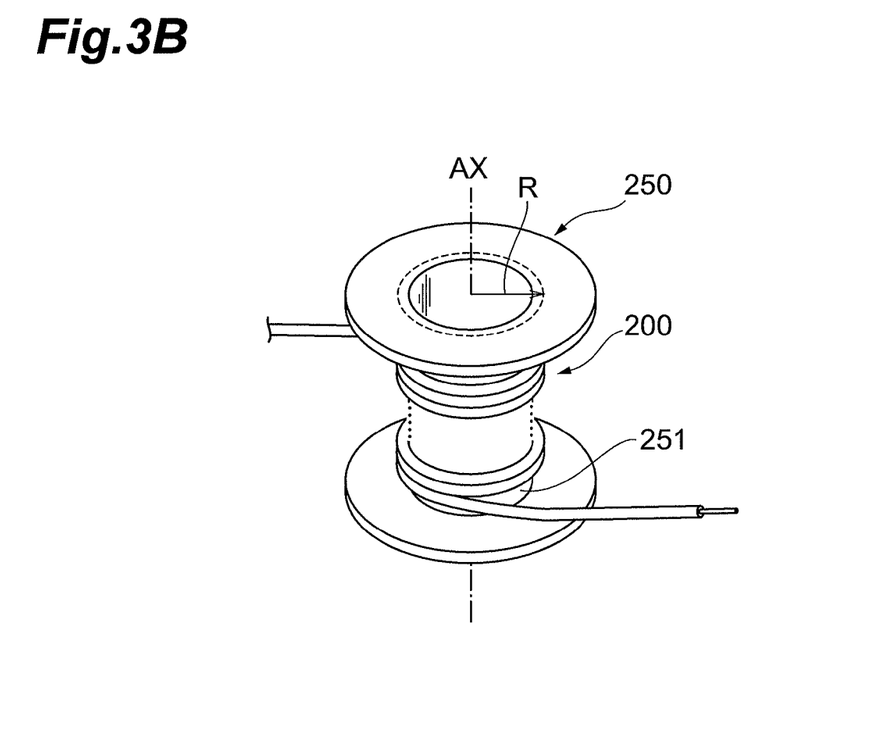
FIG. 3B is a view showing how it is installed.
Figure 4:
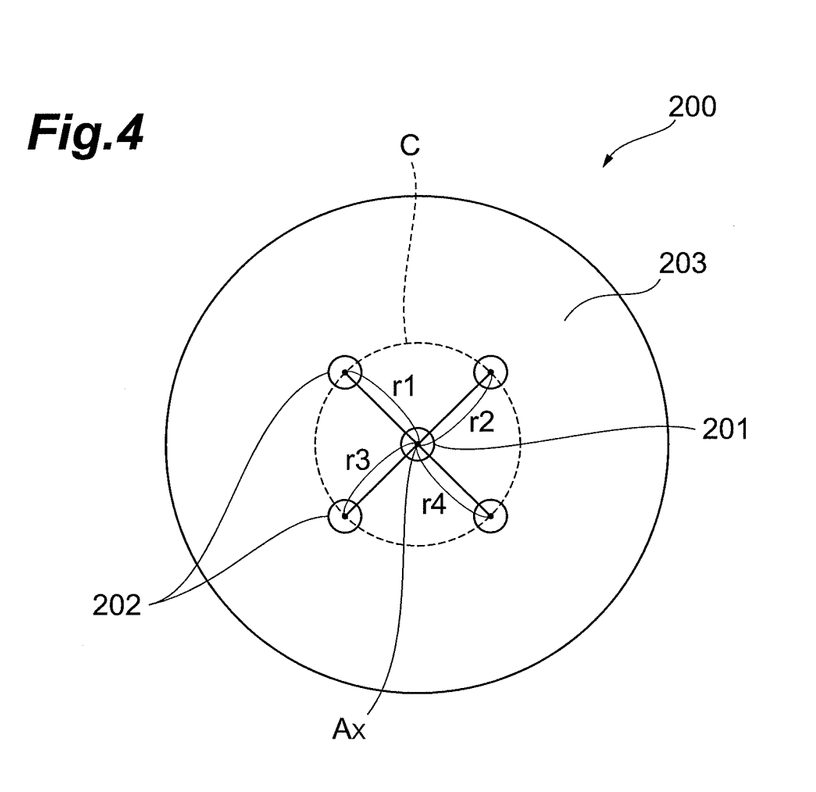
FIG. 4 is a diagram showing a cross-sectional structure of the multicore optical fiber taken along the line III-III in FIGS. 2A and 2B.

FIGS. 2A and 2B are diagrams showing schematic structures of the first embodiment of the optical branching device according to the present invention. Specifically, FIG. 2A shows a structure in which the optical branching device includes none of entrance and exit optical fibers, while FIG. 2B shows a structure in which the optical branching device includes entrance and exit optical fibers. FIG. 3A is a view showing a schematic structure of a multicore optical fiber constituting a part of the optical branching device according to the first embodiment, while FIG. 3B is a view showing how it is installed. FIG. 4 is a sectional view of the multicore optical fiber taken along the line III-III in FIGS. 2A and 2B. This optical branching device is a device having a function similar to that of the optical branching devices 11, 30 in the optical communication system shown in FIG. 1. A common multicore optical fiber 200 is employed for the optical branching devices 100A, 100B of FIGS. 2A and 2B.

In particular, the optical branching device 100A shown in FIG. 2A comprises the multicore optical fiber 200 and a fan-out part 300. The multicore optical fiber 200 comprises a first core extending along a predetermined axis, one or more second cores, and a cladding surrounding the first and second cores. The multicore optical fiber 200 has one end face (first end face) which guides light from the outside and opposes an optical fiber 12, the other end face (second end face) opposing the one end face, an entrance port 200A (entrance port A) disposed on the one end face, and exit ports 200B (exit ports B) disposed on the other end face. In the multicore optical fiber 200, the one end face is optically coupled to the optical fiber 12 in the front stage through the entrance port 200A, while the other end face is coupled to the fan-out part 300 through the exit ports 200B. The fan-out part 300 has one end face (third end face) opposing the other end face of the multicore optical fiber 200, the other end face (fourth end face) opposing the one end face, entrance ports 300A (entrance ports C) disposed on the one end face, and exit ports 300B (exit ports D) disposed on the other end face. In the fan-out part 300, the light beams emitted from the second cores of the multicore optical fiber 200 enter the entrance ports 300A and exit to optical fibers 31 in the rear stage through the respective exit ports 300B different from each other.

In FIG. 2A, the parts indicated by points (•) in 200A, 200B, 300A, 300B represent ports arranged one- or two-dimensionally on end faces corresponding to cores, while the number of ports varies depending on the number of cores (ditto with FIG. 2B). In the structural example shown in FIG. 2A, the entrance port 200A is a port corresponding to the end face of a first core 201 in the multicore optical fiber 200 optically coupled to the core of the optical fiber 12. Each set of the ports 200B, 300A, 300B is arranged one- or two-dimensionally, while the number of ports is not limited to 4 but may be 2, 3, 4, 5, 6, or more. The outer diameter of the multicore optical fiber 200 is depicted much larger than that of the optical fiber 12 for convenience of explanation but does not reflect their actual proportions; the former may also be slightly larger or smaller than the latter.

As shown in FIGS. 3 and 4, the multicore optical fiber 200 comprises a cladding 203, a first core 201 arranged such that its optical axis coincides with the center axis $A_X$ of the cladding 203, four second cores 202 which are disposed at positions different from that of the first core 201 within the cladding 203 and extend along the center axis $A_X$, and a coating 204 covering the side face of the cladding 203. The four second cores 202 are disposed at equally spaced intervals on a circle centered at the center of the cladding 203 (i.e., the center of the first core 201).

For example, in the multicore optical fiber 200 having the structure mentioned above, the diameter of each of the first and second cores 201, 202 is 9 µm, the distance between the first and second cores 201, 202 (the distance between their centers; r1 to r4 in FIG. 4) is 14 µm, and the distance between the second cores 202 adjacent to each other (the distance between their centers) is 20 µm. The four second cores 202 are arranged at equally spaced intervals on a circle C centered at the first core 201. Each of the first and second cores 201, 202 has a step-index type refractive index profile exhibiting a refractive index difference of 0.30% with respect to the cladding 203, while the cladding 203 has a diameter of 125 µm. Since the coating 204 (see FIG. 3A) is disposed on the side face of the cladding 203, the multicore optical fiber has a total diameter of 245 µm. Preferably, in this embodiment, the multicore optical fiber 200 has such a length that light incident on the first core 201, if any, is wholly distributed to the second cores 202 by core-to-core crosstalk. When the other end face of the first core 201 is utilized as the exit port 200B, it will be sufficient if the multicore optical fiber 200 has such a length that light having about the same power as that of light exiting from the second core 2 is emitted from the first core 201.

The multicore optical fiber 200 is arranged linearly in the optical branching device 100A of FIG. 2A, but may be wound about a reel 250 or the like as shown in FIG. 3B, for example, when accommodated in a package or the like. In the example of FIG. 3B, the multicore optical fiber 200 is wound about the reel 250, which extends along the center axis $A_X$ and has a barrel with a radius R of 30 mm, by 10 turns while being provided with a full twist per turn. In particular, a structure in which the multicore optical fiber is installed within a predetermined space while being provided with a predetermined bend as shown in FIG. 3B makes it possible to adjust the branching ratio of output light between the first and second cores 201, 202.

The multicore optical fiber 200 has one end face provided with the entrance port 200A (coinciding with one end face of the first core 201) and the other end face provided with the exit ports 200B (coinciding with the respective other end faces of the second cores 202). The optical fiber 12 is optically coupled to the entrance port 200A, while the second cores 202 of the multicore optical fiber 200 excluding the first core 201 are optically coupled to the fan-out part 300 through the exit ports 200B. The fan-out part 300 is an optical part for emitting the light beams having exited from the respective second cores 202 into a plurality of optical fibers 31 different from each other in a rear stage. That is, the light beams having exited from the second cores 202 of the multicore optical fiber 200 to the fan-out part 300 are emitted from the fan-out part 300 after changing their optical paths therein. The structure of the fan-out part 300 is not restricted in particular, whereby well-known fan-out parts are employable as the fan-out part in this embodiment.

Figure 5:
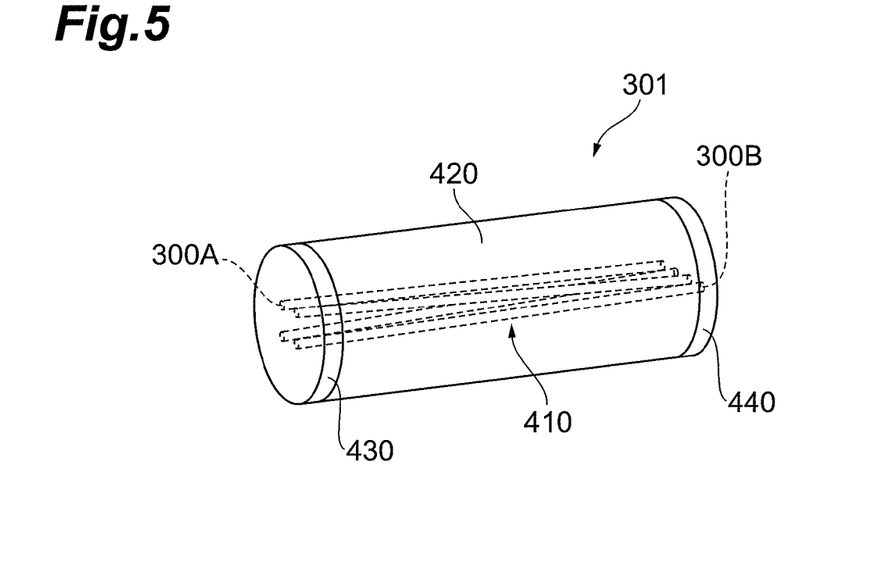
FIG. 5 is a view showing an example of a schematic structure of a fan-out part constituting the optical branching device according to the first embodiment.
Figure 6:
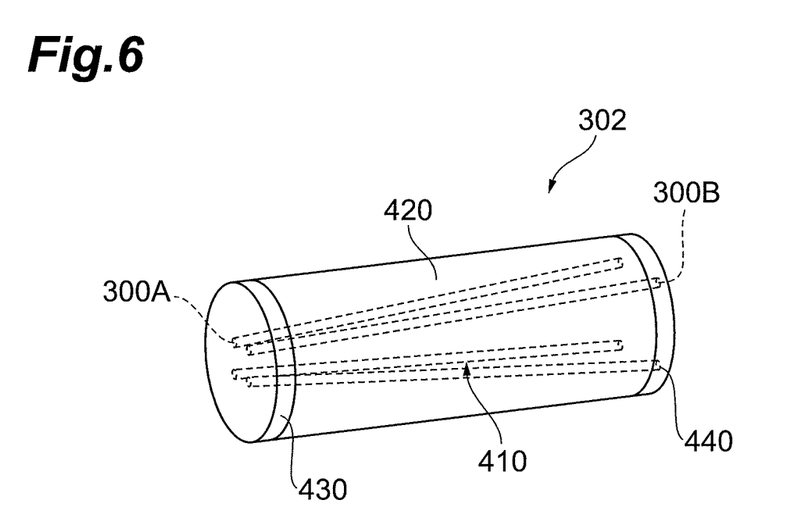
FIG. 6 is a view showing another example of the schematic structure of the fan-out part constituting the optical branching device according to the first embodiment.

FIG. 5 shows an example of fan-out parts employed in the optical branching device 100A depicted in FIG. 2A. The fan-out part 301 of FIG. 5 has a structure in which optical waveguide members 410 made of silica glass or the like are provided by a number corresponding to that of the second cores 202 and covered with a resin 420 thereabout. In each of the optical waveguide members 410, one end face is an entrance port 300A optically coupling with its corresponding exit port 200B of the multicore optical fiber 200, while the other end face is an exit port 300B for emitting light to an optical fiber in a rear stage. The entrance ports 300A of a plurality of optical waveguide members 410 are arranged such that the respective end faces of the two-dimensionally arranged four second cores 202 are optically coupled one-to-one to the optical waveguide members 410 at their end faces on the entrance port 300A side. The exit ports 300B of the optical waveguide members 410 are arranged such that the four optical waveguide members 410 are optically coupled one-to-one at their end faces on the exit port 300B side to the respective end faces of the optical fibers 31 in the rear stage. In the fan-out part 301 of FIG. 5, the exit ports 300B are arranged linearly, i.e., one-dimensionally, so that their center-to-center distance is longer than that of the entrance ports 300A. The exit ports 300B are arranged one-dimensionally in the fan-out part 301 of FIG. 5 but may be arranged two-dimensionally as shown in FIG. 6 (a fan-out part 302). Both ends of the optical waveguide members 410, i.e., the end faces on the entrance port 300A side and exit port 300B side, are fixed by planar securing members 430, 440, each made of silica glass, zirconia, or the like, respectively. Examples of methods for connecting the fan-out part 301 to the multicore optical fiber 200 include connector coupling and fusion splicing. The number of optical waveguide members 410 is not limited to 4. In a structure in which the other end face of the first core 201 is not utilized as the exit port 200B, the number of optical waveguide members 410 may be equal to or less than the total number of second cores 202. When both end faces of the first core 201 are used as the entrance port 200A and exit port 200B, respectively, it will be sufficient if the number of optical waveguide members 410 is at least 2 but not more than the total number of cores in the multicore optical fiber 200.

When light emitted from the optical fiber 12 in the front stage is incident on the entrance port 200A of the multicore optical fiber 200 in the optical branching device 100A having the structure mentioned above, the light propagates through the first core 201 from the entrance port 200A. During this period, the light is distributed from the first core 201 to the four second cores 202 by core-to-core crosstalk between the first and second cores 201, 202. The light beams distributed to the four second cores 202 propagate through their cores, so as to enter the fan-out part 300. That is, the light beams distributed to the four second cores 202 are emitted to the four optical waveguides optically coupled core-to-core thereto within the fan-out part 300 at the exit ports 200B of the multicore optical fiber 200. Thereafter, the light beams having entered the fan-out part 300 through the entrance ports 300A propagate through the four optical waveguides corresponding thereto and exit from the exit ports 300B to a plurality of optical fibers optically coupled to the fan-out part 300. Thus, the optical branching device 100A according to this embodiment functions as a 1-input/4-output optical branching device which inputs light propagating through one optical fiber 12 in the front stage (light from the outside) and outputs it to four optical fibers 31 in the rear stage. Here, the optical branching device 100A may be accommodated in a package or the like in order to protect connecting portions between the multicore optical fiber 200 and other components or the multicore optical fiber 200 itself when necessary.

The optical branching device shown in FIG. 2B will now be explained. The structure of the optical branching device 100B of FIG. 2B differs from that of the optical branching device 100A of FIG. 2A in that it includes entrance and exit optical fibers. The following are specific differences.

In the optical branching device 100B, an entrance optical fiber 110 for causing light from the optical fiber 12 to enter the multicore optical fiber 200 is disposed between the multicore optical fiber 200 and the optical fiber 12 in front thereof. The fan-out part 300 of the optical branching device 100B is constituted by a securing member 320 and exit optical fibers 310.

In the optical branching device 100B, the entrance port 200A (entrance port A) of the multicore optical fiber 200 is optically coupled to the entrance optical fiber 110 optically coupled to the optical fiber 12 in the front stage. The entrance optical fiber 110 and multicore optical fiber 200 can be connected to each other by fusion splicing or the like. On the other hand, the exit ports 200B of the multicore optical fiber 200 (exit ports B) located on the fan-out part 300 side are optically coupled to the entrance ports A (entrance ports C) disposed on one end face 320A (third end face) of the securing member 320 constituting the fan-out part 300. The securing member 320, which is a member for securing end parts of a plurality of exit optical fibers 310 optically coupling with the optical fibers 31 in the rear stage at the exit ports 300B (exit ports D) disposed on the other end face (fourth end face) of the fan-out part 300 to the entrance ports 300A, has the other end face 320B to which one end face of each exit optical fiber 310 is secured. This structure causes the light beams emitted from the exit ports 200B of the multicore optical fiber 200 to enter the exit optical fibers 310 from the entrance ports 300A and exit from the exit ports 300B to the optical fibers 31 in the rear stage.

Figure 7:
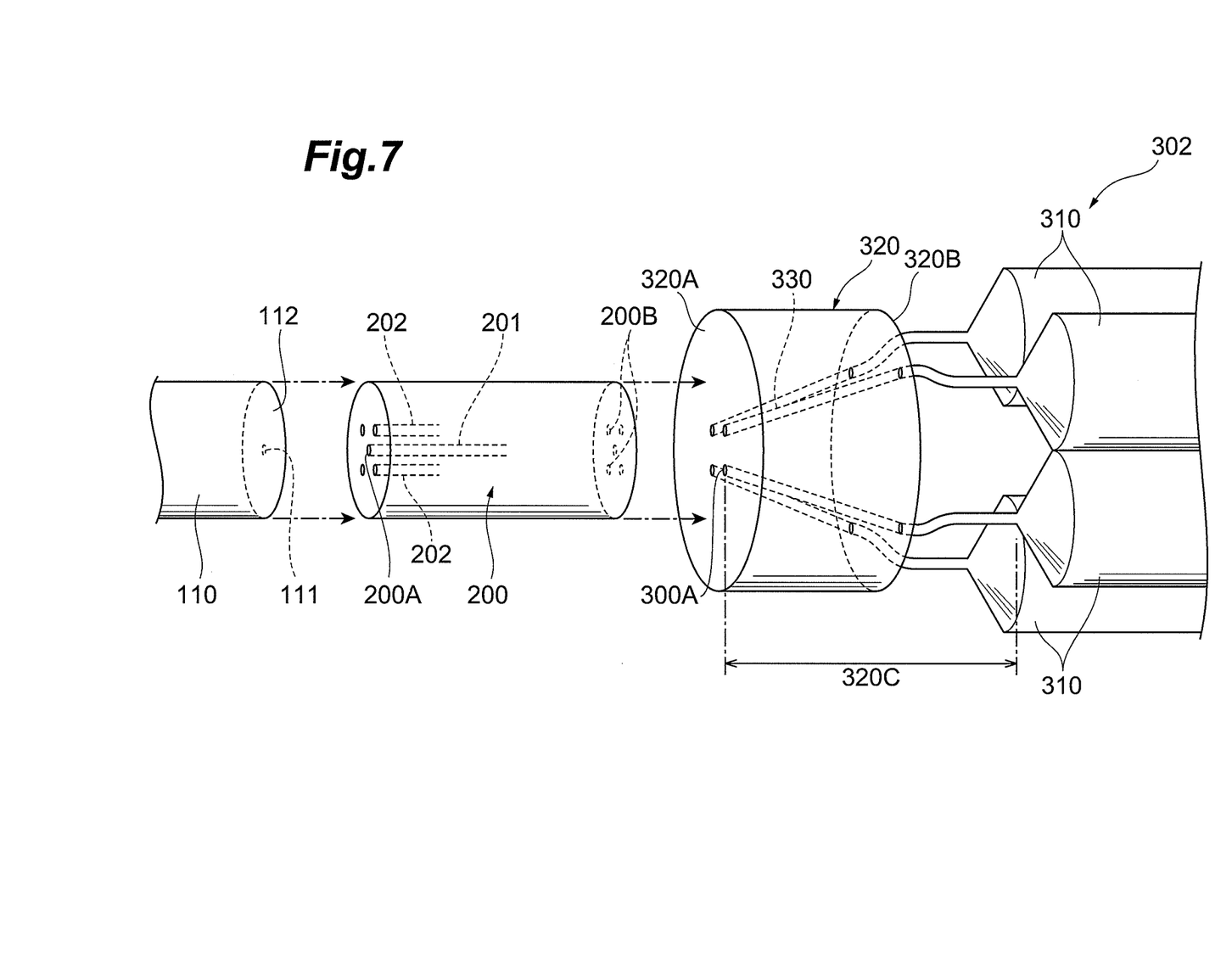
FIG. 7 is a view more specifically showing an example of the structure of the optical branching device constructed as depicted in FIG. 2B.

FIG. 7 shows a more specific structural example of the optical branching device 100B depicted in FIG. 2B (the fan-out part 302 mainly represented by the securing member 320 in particular). The fan-out part 302 of FIG. 7 comprises the securing member 320 and four single-core fibers 310 (each of which is an optical fiber having a single core within its cladding) functioning as exit optical fiber. The securing member 320 has a first end face 320A (an end face provided with the entrance ports 300A of the fan-out member 302) secured by an adhesive or the like to an end face of the multicore optical fiber 200 provided with the exit ports 200B to be connected, a second end face 320B to which one end of each exit optical fiber 310 is secured by fusion or the like, and a plurality of through holes 330 communicating between the first and second end faces 320A, 320B. On the first end face 320A, the plurality of through holes 330 are arranged such as to coincide with a core arrangement (the second cores 202) functioning as the exit ports 200B at the light exit end face of the multicore optical fiber 200 to be connected. In FIG. 7, within the securing member 320, the exit optical fibers 310 are partly depicted by broken lines along the through holes 330 such that the state of insertion of the exit optical fibers 310 can be seen.

In each of the four exit optical fibers 310, a leading end portion 320C including an end face functioning as the entrance port 300A is shaped thinner than the outer diameter of the remaining portion and inserted into its corresponding through hole 330 of the securing member 320. The leading end portion 320C is shaped thinner than the outer diameter of the remaining portion, since the core distance of the multicore optical fiber 200 is shorter than the typical outer diameter (cladding diameter) of the plurality of exit optical fibers 310, which is 125 μm or longer, so that the entrance ports 300A are hard to form at the interval coinciding with the core distance of the multicore optical fiber 200 without changing the outer diameter of the plurality of exit optical fibers 310.

In the optical branching device 100B having the structure mentioned above, the light emitted from the optical fiber 12 in the front stage travels through the entrance optical fiber 110, so as to enter the entrance port 200A of the multicore optical fiber 200. The light having entered the first core 201 through the entrance port 200A propagates through the first core 201, while thus propagated light is distributed from the first core 201 to four second cores 202 by core-to-core crosstalk between the first and second cores 201, 202. The light beams distributed to the four second cores 202 propagate through their corresponding cores. Thereafter, the light beams propagated through the four second cores 202 enter the fan-out part 302 optically coupled core-to-core thereto at the exit ports 200B disposed on the end face opposite from the end face provided with the entrance port 200A. That is, the light beams having entered the four exit optical fibers 310 through the entrance ports 300A propagate through the four exit optical fibers 310, so as to exit to the four optical fibers 31 optically coupled to the fan-out part 302 through their corresponding exit ports 300B, respectively. Thus, the optical branching device 100B according to this embodiment functions as a 1-input/4-output optical branching device which inputs light propagating through one optical fiber 12 in the front stage (light from the outside) and outputs it to four optical fibers 31 in the rear stage.

Figure 8:
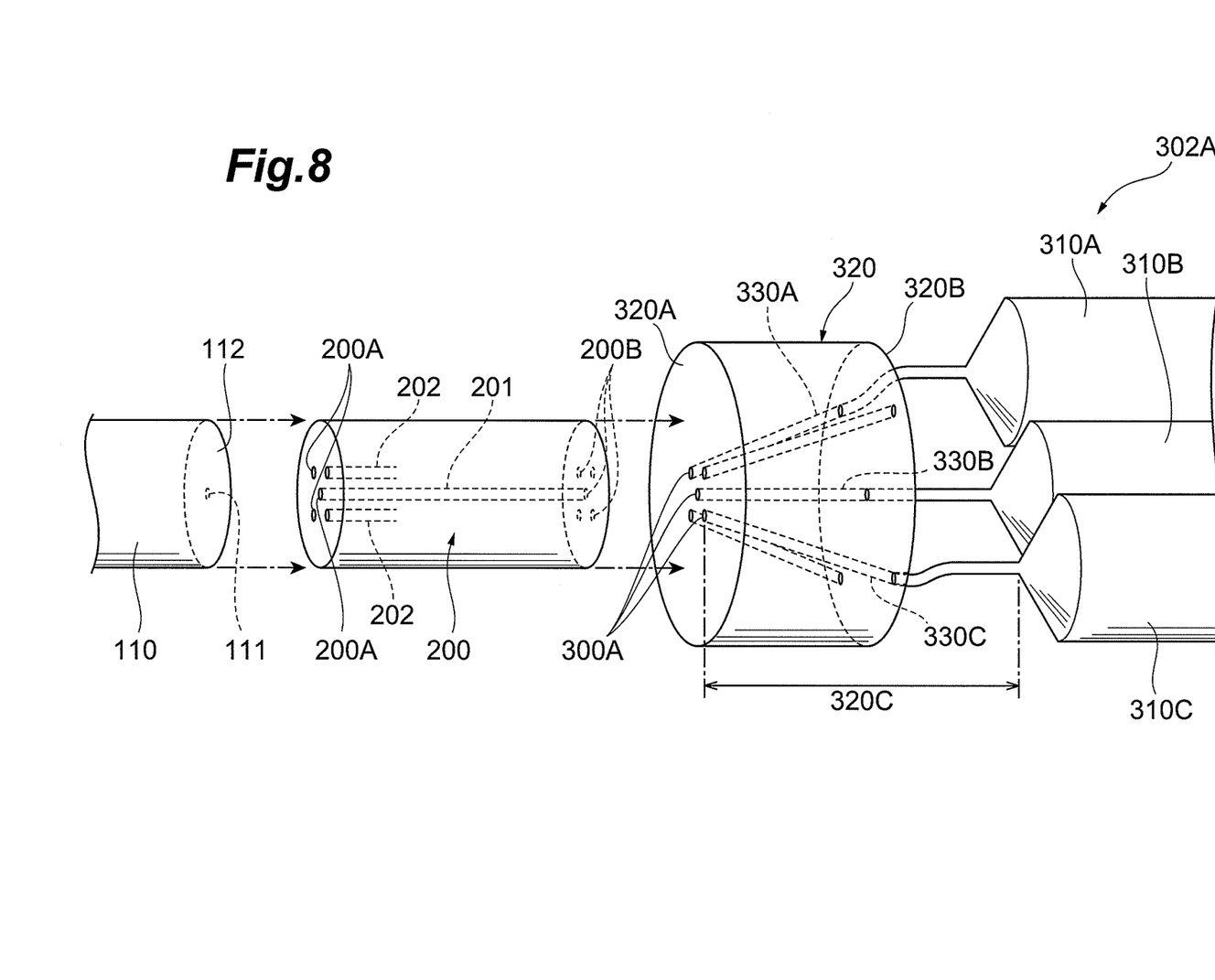
FIG. 8 is a view more specifically showing another structure (example of use) of the optical branching device constructed as depicted in FIG. 2B.

In the structure of the optical branching device 100B shown in FIG. 7, one end face of the first core 201 in the multicore optical fiber 200 is utilized as the entrance port 200A, while the other end face is not employed as the exit port 200B. However, the length of the multicore optical fiber 200 may be adjusted such that the other end face of the first core 201 can be used as the exit port 200B. The optical branching devices 100A, 100B may also employ a structure in which only a part of the exit ports 200B of the multicore optical fiber 200 is connected to the exit optical fibers 31. For example, FIG. 8 is a view more specifically showing another structure of the optical branching device 100B (a fan-out part 302A mainly represented by the securing member 320 in particular) depicted in FIG. 2B. The fan-out part 302A of FIG. 8 comprises the securing member 320 and three single-core fibers 310A to 310C as exit optical fibers. The securing member 320 has a first end face 320A (an end face provided with entrance ports 300A of the fan-out part 302A) secured by an adhesive or the like to an end face of the multicore optical fiber 200 provided with the exit ports 200B to be connected, a second end face 320B to which one end of each of the three exit optical fibers 310A to 310C is secured by fusion or the like, and a plurality of through holes communicating between the first and second end faces 320A, 320B. On the first end face 320A, the plurality of through holes are arranged such as to coincide with a core arrangement (the first and second cores 201, 202) functioning as the exit ports 200B at the light exit end face of the multicore optical fiber 200 to be connected. In FIG. 8, within the securing member 320, the exit optical fibers 310 are partly depicted by broken lines along the through holes such that the state of insertion of the exit optical fibers 310A to 310C can be seen.

In each of the three exit optical fibers 310A to 310C, a leading end portion 320C including an end face functioning as the entrance port 300A is shaped thinner than the outer diameter of the remaining portion and inserted into its corresponding through hole 330A to 330C of the securing member 320. No leading end portions of the exit optical fibers are inserted in through holes other than the through holes 330A to 330C.

In the optical branching device 100B having the structure mentioned above, the light emitted from the optical fiber 12 in the front stage travels through the entrance optical fiber 110, so as to enter the entrance port 200A of the multicore optical fiber 200. A part of the light having entered the first core 201 through the entrance port 200A propagates through the first core 201, while thus propagated light is distributed from the first core 201 to four second cores 202 by core-to-core crosstalk between the first and second cores 201, 202. The light beams distributed to the first core 201 and four second cores 202 propagate through their corresponding cores. Thereafter, the light beams propagated through the first core 201 and four second cores 202 enter the fan-out part 302A optically coupled core-to-core as necessary thereto at the exit ports 200B disposed on the end face opposite from the end face provided with the entrance port 200A. That is, the light beams having entered the three exit optical fibers 310A to 310C through the entrance ports 300A propagate through the three exit optical fibers 310A to 310C, so as to exit to the three optical fibers 31 optically coupled to the fan-out part 302A through their corresponding exit ports 300B, respectively. Thus, the structure shown in FIG. 8 functions as a 1-input/3-output optical branching device which inputs light propagating through one optical fiber 12 in the front stage (light from the outside) and outputs it to three optical fibers 31 in the rear stage.

In any of the structures shown in FIGS. 7 and 8, a typical single-mode optical fiber is favorably used as the entrance optical fiber 110 connected to the multicore optical fiber 200. The single-mode entrance optical fiber 110 has a cladding 112 whose outer diameter substantially equals that of the cladding 203 of the multicore optical fiber 200 and a core 111 whose outer diameter substantially equals that of the first core 201 in the multicore optical fiber 200. In this state, the core 111 of the entrance optical fiber 110 and the first core 201 of the multicore optical fiber 200 are optically coupled to each other at the end face provided with the entrance ports 200A. The entrance optical fiber 110 and multicore optical fiber 200 are connected to each other by fusion splicing or the like.

The structure of the fan-out part 300 is not limited to that of the fan-out part 301 in FIG. 5 and that of the fan-out part 302 (302A) in FIG. 6. For example, a fan-out part having such a structure as to increase the port interval optically by combining optical components such as lens systems, reflection systems, and light guiding systems can be employed as the fan-out part in this embodiment.

In the optical branching devices 100A, 100B according to this embodiment, the optical fiber 12 in the front stage can easily be optically coupled to the entrance optical fiber 110 in front of the multicore optical fiber 200 or to the multicore optical fiber 200. Therefore, the optical branching devices 100A, 100B are easier to connect with optical fibers as compared with conventional optical branching devices using optical waveguide chips.

Arranging the second cores 202 at equally spaced intervals on a circle centered at the first core 201 placed at the center of the multicore optical fiber 200 makes it possible for light to be branched at uniform ratios from the first core 201 to a plurality of second cores 202.

When the multicore optical fiber 200 is wound about the reel 250, which has a barrel with a radius R (=30 mm), by 10 turns while being provided with a full twist per turn as shown in FIG. 3B, the bending direction of the multicore optical fiber 200 caused by winding about the barrel of the reel 250 changes longitudinally (along the optical axis) because of the twist, thereby reducing fluctuations in core-to-core crosstalk. Therefore, the uniformity in distribution of optical powers to the cores is kept in the multicore optical fiber 200.

When the multicore optical fiber 200 having flexibility is employed as a part of the optical branching device, a higher degree of freedom in form can be attained as compared with the case where an optical waveguide chip having no flexibility is employed as a part of the optical branching device, whereby the form of the optical branching device can be changed according to its use and so forth.

Though the above-mentioned example explains a structure in which the multicore optical fiber 200 is wound about the barrel of the reel 250 while being provided with a twist in order to distribute light uniformly, a method of winding it about the barrel of the reel 250 without twist is also employable for yielding differences in optical powers distributed to the cores. Thus winding the multicore optical fiber 200 about the barrel of the reel 250 without twist can increase (or decrease) the optical power distributed to a specific core in a plurality of second cores 202. Changing the barrel diameter (=2R) of the reel 250 about which the multicore optical fiber 200 is wound can alter optical power differences between the cores.

Though the above-mentioned embodiment exemplifies fusion splicing as a method of connecting the entrance optical fiber 110 and multicore optical fiber 200 to each other, this may be replaced by typical means for connecting single-mode optical fibers to each other such as connector coupling and mechanical splicing. Since a method of connecting single-mode optical fibers to each other is thus employable, the structures of the optical branching devices 100A, 100B according to this embodiment greatly reduce the time and effort of connection as compared with the structure of the prior art employing an optical waveguide chip in a part of the optical branching device.

Though the multicore optical fiber 200 is wound about the barrel of the reel 250 in the above-mentioned embodiment, this is not essential in distributing optical power from the first core 201 to the second cores 202 by core-to-core crosstalk. Hence, according to the mode in which the optical branching devices 100A, 100B are contained in a package or the like, the multicore optical fiber 200 may be accommodated without being wound about the reel.

In the above-mentioned embodiment, the multicore optical fiber 200 distributes light from the first core 201 to the second cores 202 by using core-to-core crosstalk. However, a desirable branching ratio may not be achieved when significant core-to-core crosstalk is generated in the fan-out part 300. Therefore, a structure which suppresses core-to-core crosstalk can be provided in the fan-out part 300. Specifically, a region which has a low refractive index difference and reduces the power of leak light from an optical waveguide propagating light in the fan-out part 300 (e.g., a structure for reducing the quantity of leak light by optical control such as confinement) may be provided so as to surround the optical waveguide.

Second Embodiment

Figure 9:
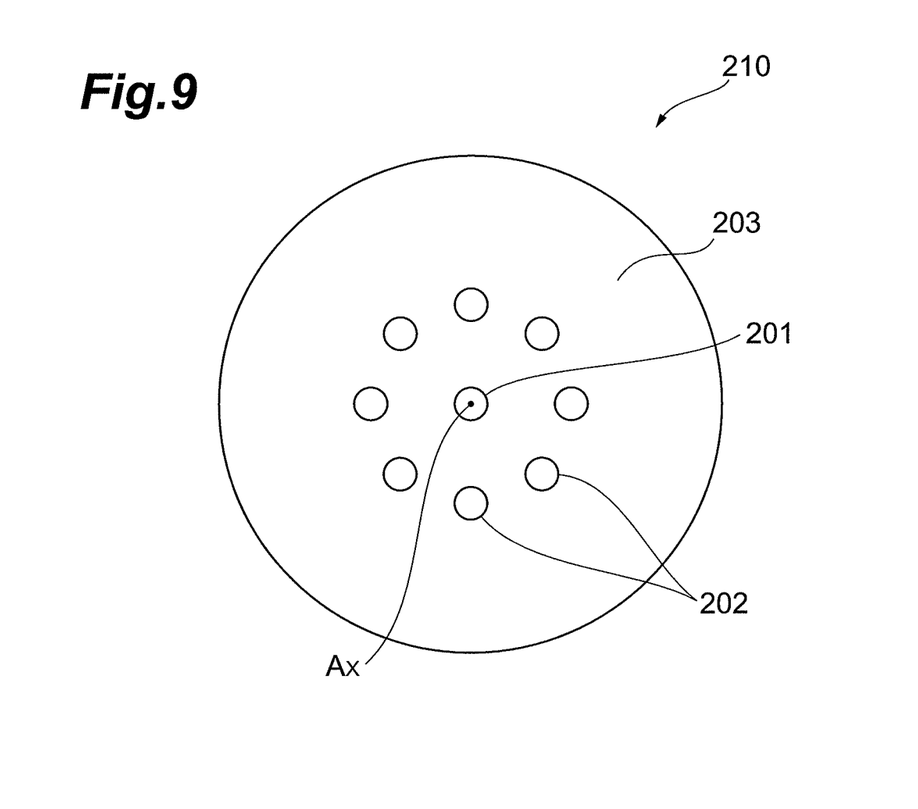
FIG. 9 is a sectional view showing a structure of the multicore optical fiber constituting a part of the optical branching device according to a second embodiment, coinciding with a sectional view of the multicore optical fiber taken along the line III-III in FIGS. 2A and 2B.

FIG. 9 is a sectional view showing a structure of the multicore optical fiber constituting a part of the optical branching device according to the second embodiment, coinciding with a sectional view of the multicore optical fiber taken along the line in FIGS. 2A and 2B. The optical branching device according to the second embodiment differs from the optical branching device according to the first embodiment in the structure of the multicore optical fiber, i.e., the number and arrangement of second cores.

In a multicore optical fiber 210 constituting a part of the optical branching device of the second embodiment, as shown in FIG. 9, eight second cores 202 within a cladding 203 are disposed about a first core 201 in a cross section (a plane orthogonal to the center axis $A_X$ of the multicore optical fiber 210). The second cores 202 are arranged at equally spaced intervals on a circle centered at the center axis $A_X$ of the multicore optical fiber 210 (coinciding with the optical axis of the first core 201).

For example, in the multicore optical fiber 210 of FIG. 9, the diameter of each of the first and second cores 201, 202 is 8.5 µm, and the distance between the first and second cores 201, 202 (the distance between their centers) is 20 µm. Each of the first and second cores 201, 202 has a step-index type refractive index profile with a refractive index difference of 0.35%, while the cladding 203 has a diameter of 125 µm. Since the coating 204 (see FIG. 3A) is disposed on the side face of the cladding 203, the multicore optical fiber 210 has a total diameter of 245 µm. The multicore optical fiber 210 has such a length that, when light is incident on the first core 201, the intensity of light distributed to the second cores 202 by core-to-core crosstalk is maximized while the intensity of light in the first core 201 is minimized. The length of the multicore optical fiber 210 becomes shorter when the first core 201 is also utilized as the exit port 200B of the multicore optical fiber 210 than when not.

An entrance optical fiber made of a typical single-mode optical fiber is fusion-spliced to one end face (the surface corresponding to the end face 200A in FIGS. 2A and 2B) of the multicore optical fiber 210 as in the optical branching devices 100A, 100B of FIGS. 2A and 2B. This optically couples the core of the entrance optical fiber and the first core 201 of the multicore optical fiber 210 to each other, while a fan-out part (corresponding to the fan-out part 300 shown in FIGS. 2A and 2B except for the number of exit optical fibers) for guiding light beams from the eight second cores 202 of the multicore optical fiber 210 to eight exit optical fibers different from each other is optically coupled to the other end face (the surface corresponding to the end face 200B in FIGS. 2A and 2B).

In the foregoing structure, when light is incident on the first core 201 of the multicore optical fiber 210 from the entrance optical fiber, which is a typical single-mode optical fiber, optical power is distributed to the eight second cores 202 by core-to-core crosstalk between the first and second cores 201, 202. Here, in the multicore optical fiber 210, the eight second cores 202 including their distances are designed identically, whereby light is uniformly distributed thereto. Thus, the optical branching device according to this embodiment functions as a 1-input/8-output optical branching device which inputs light from one entrance optical fiber and outputs it to eight exit optical fibers at a maximum. Here, when necessary, connecting portions between the multicore optical fiber 210 and other components or the multicore optical fiber 210 itself may be accommodated in a package or the like in order to protect them. In the optical branching device in this embodiment, the first core 201 may or may not be optically coupled to the fan-out part.

In the optical branching device according to the second embodiment having the structure mentioned above, as in the optical branching device according to the first embodiment, the entrance optical fiber in the front stage is optically coupled to the first core of the multicore optical fiber 210, while optical fibers in the rear stage are optically coupled to the fan-out part. Therefore, the structure of the optical branching device according to this embodiment is easier to connect with the optical fibers in the front and rear stages as compared with the conventional optical branching devices employing optical waveguide chips.

Arranging the second cores 202 at equally spaced intervals on a circle centered at the first core 201 placed at the center of the multicore optical fiber 210 makes it possible for light to be branched at uniform ratios from the first core 201 to a plurality of second cores 202.

Figure 10:
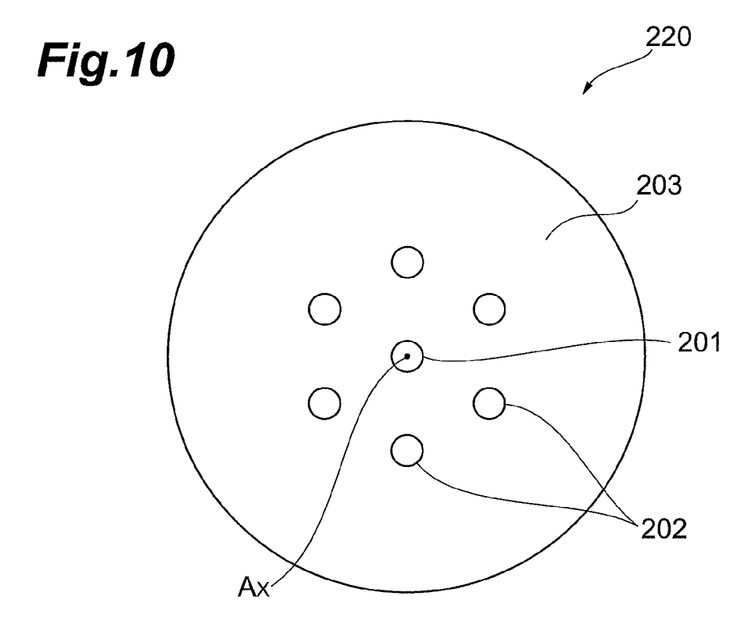
FIG. 10 is a sectional view showing another structure of the multicore optical fiber constituting a part of the optical branching device according to the second embodiment, coinciding with a sectional view of the multicore optical fiber taken along the line III-III in FIGS. 2A and 2B.

FIG. 10 is a sectional view showing another structure of the multicore optical fiber constituting a part of the optical branching device according to the second embodiment, coinciding with a sectional view of the multicore optical fiber taken along the line III-III in FIGS. 2A and 2B. The multicore optical fiber 220 shown in FIG. 10 differs from the multicore optical fiber 210 depicted in FIG. 9 in the structure of the multicore optical fiber, i.e., the number and arrangement of second cores.

As shown in FIG. 10, in the multicore optical fiber 220 constituting a part of the optical branching device according to the second embodiment, six second cores 202 are arranged about the first core 201. The second cores 202 are arranged at equally spaced intervals on a circle centered at the center axis $A_X$ of the multicore optical fiber 220 (coinciding with the optical axis of the first core 201). Thus, the number of second cores constituting the multicore optical fiber can be changed as appropriate. That is, the number of second cores arranged about the first core 201 is not limited to the numbers explained in the above-mentioned embodiments, e.g., 4, 6, and 8, but may be 3, 10 or more, or 20 or more as well.

Without being restricted to the first and second embodiments explained in the foregoing, the present invention can be modified in various ways.

For example, the second cores 202 are located on a circle centered at the center axis $A_X$ of the multicore optical fiber in the above-mentioned first and second embodiments. However, the second cores 202 may be arranged at positions different from a circle centered at the center axis $A_X$ of the multicore optical fiber. The number of second cores 202 is not necessarily a plural but may be at least 1 when the first core is utilized as an output port as in the following third embodiment.

Though the above-mentioned embodiments explain structures in which the first core is not connected to the fan-out part, the first core can also be connected to the fan-out part. When the first core is connected to the fan-out part, a structure in which light having the same quantity as that distributed to each of the second cores propagates through the first core in the multicore optical fiber is preferred. When the first core is not connected to the fan-out part, a structure in which the light incident on the first core is wholly distributed to the second cores is preferred as explained in the above-mentioned embodiments.

Third Embodiment

Figure 11A:
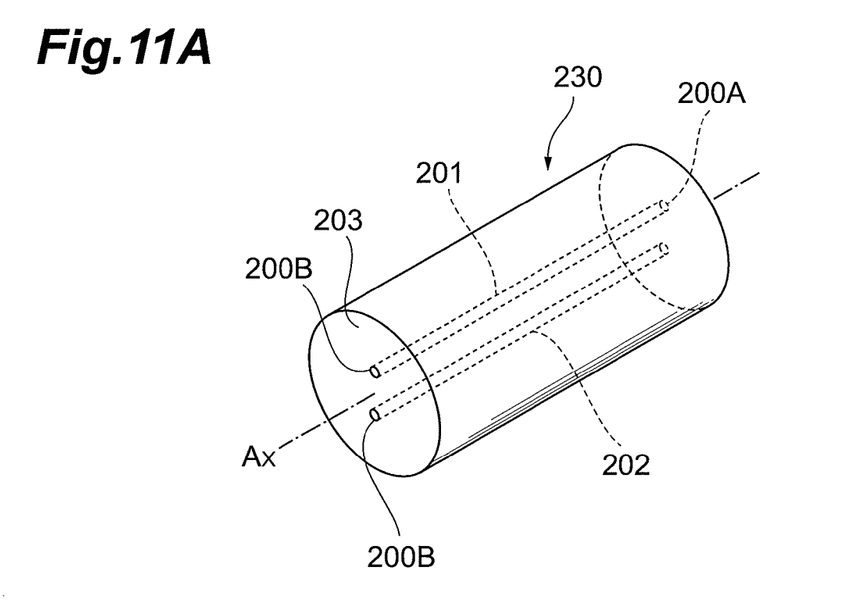
FIGS. 11A and 11B are sectional views showing structures of the multicore optical fiber constituting a part of the optical branching device according to a third embodiment, coinciding with a sectional view of the multicore optical fiber taken along the line III-III in FIGS. 2A and 2B.
Figure 11B:
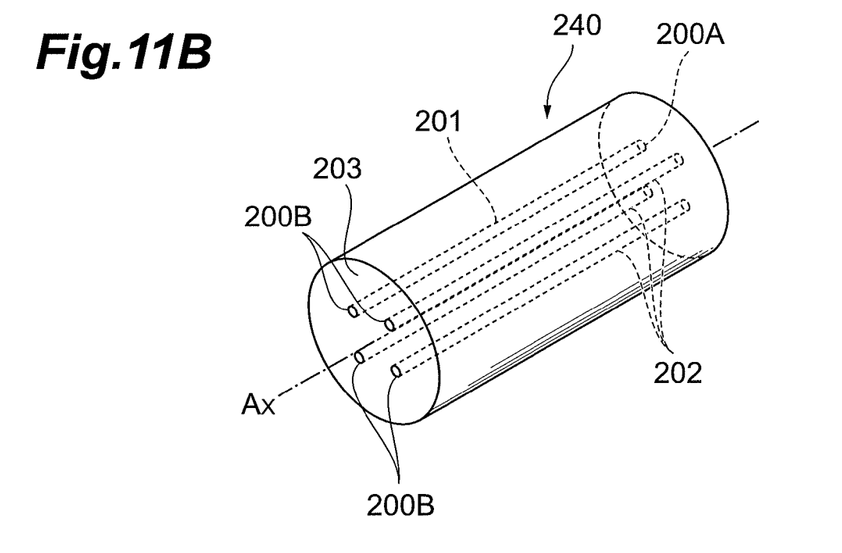

FIGS. 11A and 11B are sectional views showing structures of the multicore optical fiber constituting a part of the optical branching device according to the third embodiment, coinciding with a sectional view of the multicore optical fiber taken along the line III-III in FIGS. 2A and 2B. The optical branching device according to the third embodiment differs from the optical branching device according to the first embodiment in the structure of the multicore optical fiber, i.e., the number and arrangement of the first and second cores.

As shown in FIG. 11A, in a multicore optical fiber 230 constituting a part of the optical branching device of the third embodiment, a first core 202 and a second core 202 are arranged at positions separated from the center axis $A_X$ of the multicore optical fiber 230. In the example shown in FIG. 11A, the multicore optical fiber 230 is arranged such that one first core 201 and one second core 202 holding the center axis $A_X$ therebetween are surrounded by the cladding 203. One end face of the first core 201 becomes an entrance port 200A of the multicore optical fiber 230. On the other hand, the other end face of the first core 201 and the light exit end face of the second core 202 become exit ports 200B of the multicore optical fiber 230.

For example, in thus constructed optical fiber 230, the diameter of each of the first and second cores 201, 202 is 8.5 µm, and the distance between the first and second cores 201, 202 (the distance between their centers) is 20 µm. Each of the first and second cores 201, 202 has a step-index type refractive index profile with a refractive index difference of 0.35%, while the cladding 203 has a diameter of 125 µm. Since the coating 204 (see FIG. 3A) is provided, the multicore optical fiber 230 has a total diameter of 245 µm. Preferably, the multicore optical fiber 230 has such a length that, when light is incident on the first core 201, the intensity of light distributed to the second core 202 by core-to-core crosstalk substantially equals that of light propagating through the first core 201.

An entrance optical fiber made of a typical single-mode optical fiber is fusion-spliced to one end face (the surface corresponding to the end face 200A in FIGS. 2A and 2B) of thus constructed multicore optical fiber 230 as in the optical branching devices 100A, 100B of FIGS. 2A and 2B. This optically couples the core of the entrance optical fiber and the first core 201 of the multicore optical fiber 230 to each other. A fan-out part for guiding light beams from the first and second cores 201, 202 of the multicore optical fiber 230 to two exit optical fibers different from each other is optically coupled to the other end face (the surface corresponding to the end face 200B in FIGS. 2A and 2B).

In the foregoing structure, when light is incident on the first core 201 of the multicore optical fiber 230 from the entrance optical fiber, which is a typical single-mode optical fiber, optical power is distributed to one second core 202 by core-to-core crosstalk between the first and second cores 201, 202. Here, in the multicore optical fiber 230, one second core 202 is designed identically to the first core 201, whereby light is uniformly distributed between the first and second cores 201, 202. Thus, the optical branching device according to the present embodiment functions as a 1-input/2-output optical branching device which inputs light from one entrance optical fiber and outputs it finally to two exit optical fibers. Here, when necessary, connecting portions between the multicore optical fiber 230 and other components or the multicore optical fiber 230 itself may be accommodated in a package or the like in order to protect them.

In the optical branching device according to the third embodiment having the structure mentioned above, as in the optical branching device according to the first embodiment, the entrance optical fiber in the front stage is optically coupled to the first core 201 of the multicore optical fiber 230, while optical fibers in the rear stage are optically coupled to the fan-out part. Therefore, the structure of the optical branching device according to the present embodiment is easier to connect with the optical fibers in the front and rear stages as compared with the conventional optical branching devices employing optical waveguide chips.

Arranging the second core 202 symmetrical to the first core 201 about the center axis $A_X$ of the multicore optical fiber 230 makes it possible for light to be branched from the first core 201 to the one second core 202 at a uniform ratio.

FIG. 11B is a sectional view showing another structure of the multicore optical fiber constituting a part of the optical branching device according to the third embodiment, coinciding with a sectional view of the multicore optical fiber taken along the line III-III in FIGS. 2A and 2B. The multicore optical fiber 240 shown in FIG. 11B differs from the optical branching device shown in FIG. 11A in the structure of the multicore optical fiber, i.e., the number of second cores and the arrangement of the first and second cores.

As shown in FIG. 11B, in the multicore optical fiber 240 constituting a part of the optical branching device of the third embodiment, one first core 201 and three second cores 202 are arranged such as to surround the center axis $A_X$ of the multicore optical fiber 240 (such that the first core 201 and three second cores 202 are equally distanced from the center axis $A_X$). Thus, the number of second cores constituting the multicore optical fiber can be changed as appropriate within the cladding 203. That is, the number of second cores is not limited to 2, 4, 6, or 8, and the total number of first and second cores 201, 202 may be 10 or more or 20 or more, for example.

The end face of the multicore optical fiber 240 optically coupled to the entrance optical fiber is provided with an entrance port 200A, so that one end face of the first core 201 becomes the entrance port 200A. On the other hand, the other end face of the multicore optical fiber 240 is provided with exit ports 200B. In the multicore optical fiber 240 shown in FIG. 11B, the respective end faces of all of the first core 201 and three second cores 202 are the exit ports 200B.

As in the foregoing, the present invention yields an optical branching device which is easy to connect with optical fibers and an optical communication system including the same.

What is claimed is:

1. An optical branching device, comprising:
   a multicore optical fiber comprising a first core extending along a predetermined axis, one or more second cores, and a cladding surrounding the first and second cores;
   the multicore optical fiber having a first end face, a second end face opposing the first end face, an entrance port A, positioned on the first end face, for guiding light from the outside to the first core, and a plurality of exit ports B, positioned on the second end face, for taking out light propagated through the first and second cores; and a fan-out part having a third end face opposing the second end face of the multicore optical fiber, a fourth end face opposing the third end face, a plurality of entrance ports C positioned on the third end face and arranged so as to optically couple with the plurality of exit ports B, and a plurality of exit ports D arranged on the fourth end face so as to correspond to the plurality of entrance ports C, respectively, and have a center-to-center distance longer than that of the plurality of entrance ports C, wherein the number of the exit ports B is greater than that of the entrance port A but is equal to or less than the total number of the first and second cores; and wherein at least a part of the light incident on the first core through the entrance port A is branched to the second core by core-to-core crosstalk.

2. The optical branching device according to claim 1, wherein the fan-out part includes a plurality of exit optical fibers each having one end face coinciding with one of the plurality of entrance ports C and the other end face coinciding with one of the plurality of exit ports D corresponding thereto.

3. The optical branching device according to claim 1, further comprising an entrance optical fiber for guiding the light from the outside to the first core through the entrance port A on the first end face.

4. The optical branching device according to claim 1, wherein the first core is positioned at a cross-sectional center of the multicore optical fiber in a cross section of the multicore optical fiber orthogonal to the predetermined axis.

5. The optical branching device according to claim 1, wherein the multicore optical fiber is bent so as to adjust a branching ratio between output light from the first and second cores.

6. The optical branching device according to claim 3, wherein the multicore optical fiber and the entrance optical fiber have substantially the same cladding diameter, while respective cores thereof optically coupled to each other through the entrance port A have substantially the same diameter.

7. The optical communication system comprising the optical branching device according to claim 1,
wherein optical communication lines different from each other are individually optically coupled to the entrance port A and the plurality of exit ports D.

8. The optical branching device according to claim 4, wherein the multicore optical fiber has the plural second cores disposed about the first core, and the plural second cores are arranged at equally spaced intervals on a circle centered at the first core.

* * * * *